Aug. 17, 1965 H. S. FERGUSON 3,201,688
CIRCUIT FOR MEASURING RMS VALVE OF PULSES USING AN INTEGRATING
CIRCUIT WITH PREDETERMINED TIME CONSTANT
Filed Jan. 17, 1961 2 Sheets-Sheet 1
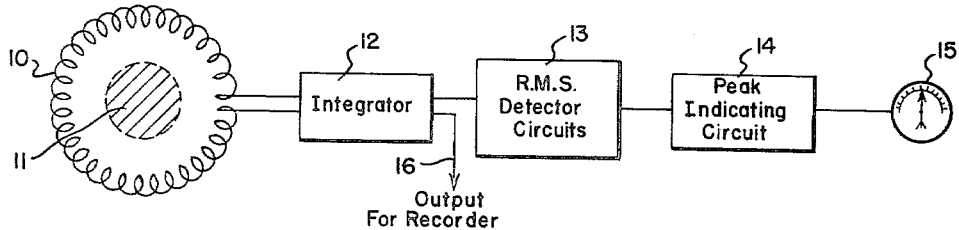
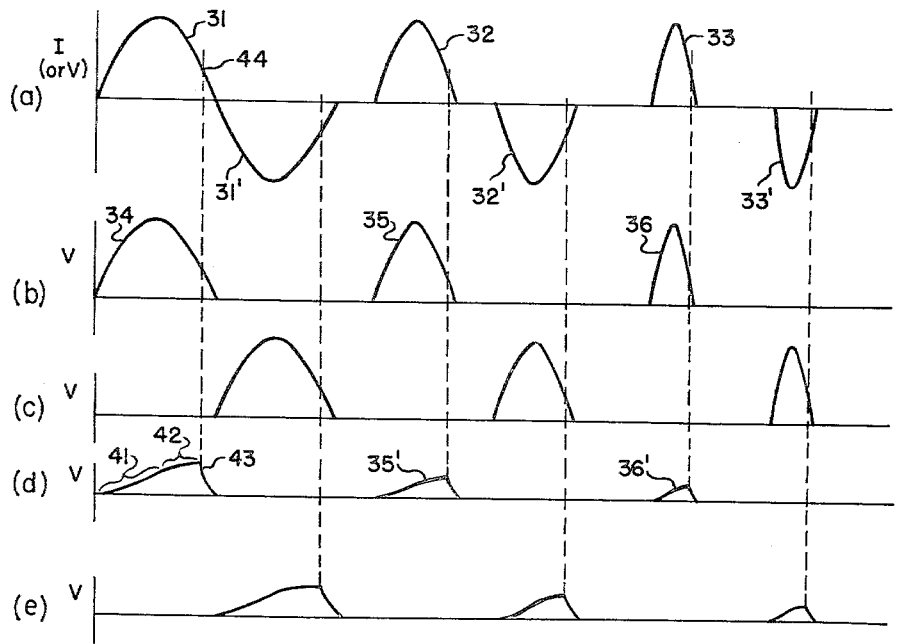
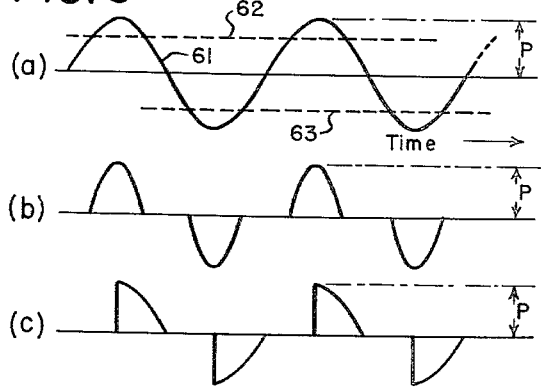
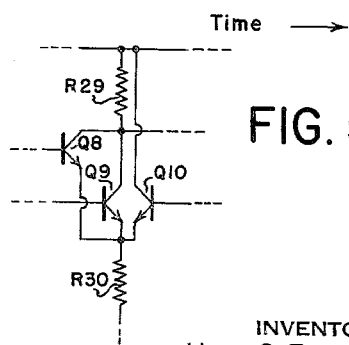
INVENTOR
Hugo S. Ferguson
ATTORNEYS

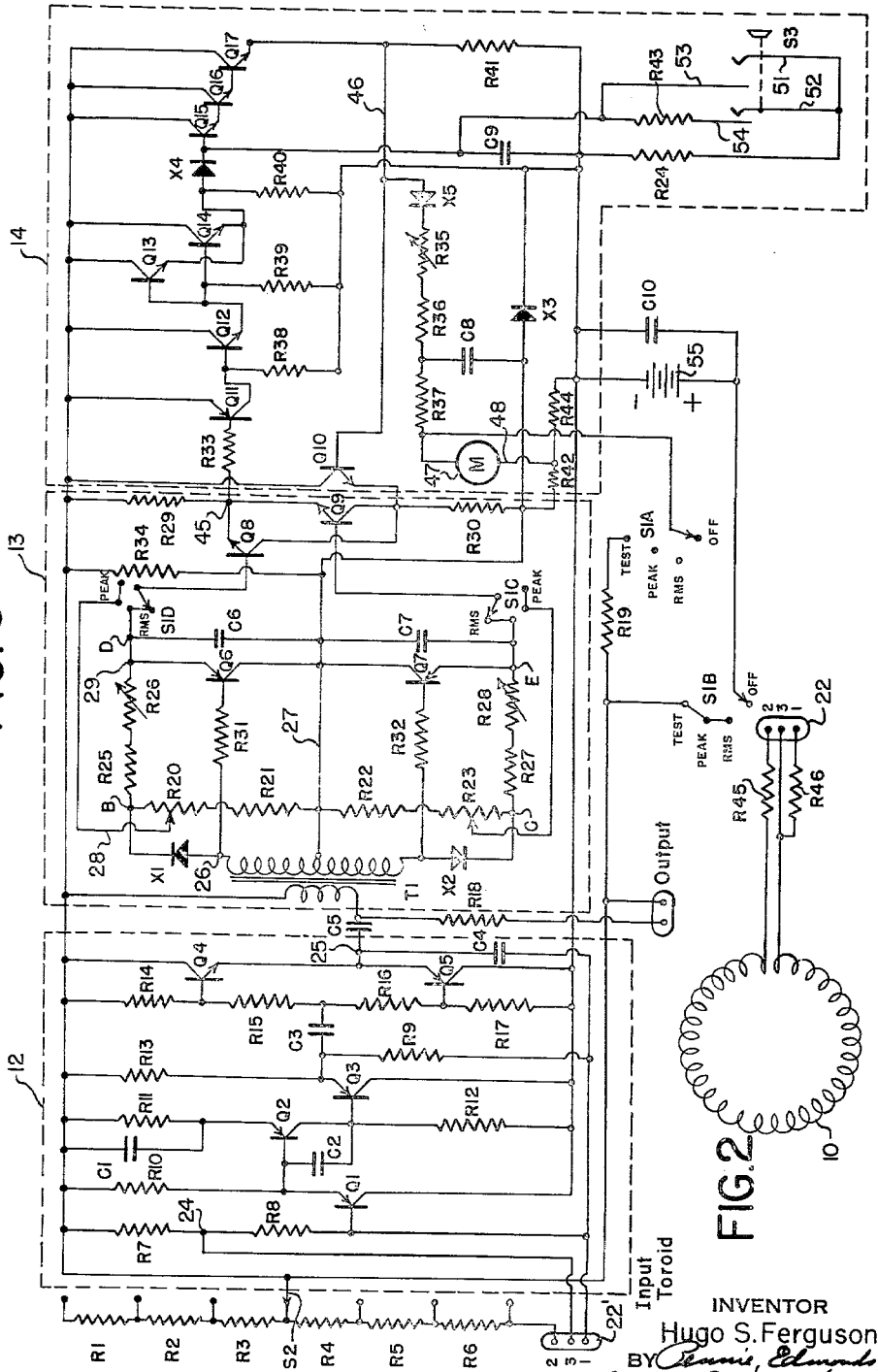

United States Patent Office 3,201,688
Patented Aug. 17, 1965

3,201,688
CIRCUIT FOR MEASURING RMS VALUE OF PULSES USING AN INTEGRATING CIRCUIT WITH PREDETERMINED TIME CONSTANT
Hugo S. Ferguson, Averill Park, N.Y., assignor to Duffers Associates, Inc., Wynantskill, N.Y., a corporation of New York
Filed Jan. 17, 1961, Ser. No. 83,232
12 Claims. (Cl. 324—103)

This invention relates to electric meters, and particularly to root-mean-square (R.M.S.) meters. The invention is especially directed to the measurement of currents used in welding operations, although not confined thereto.

Electric meters of the R.M.S. type have have known for many years. While known meters give accurate indications for sinusoidal or nearly sinusoidal waveforms, considerable error may result when the waveforms are pulsating. Also, such meters customarily give the average R.M.S. value over a larger number of cycles.

In resistance welders it is common to employ 60 c./s. single-phase current which may be sinusoidal or nearly sinusoidal at full heat setting, but is pulsating at lower heat settings. Large currents of the order of thousands of amperes may be involved, and are commonly obtained from the secondary of a transformer. For proper control of the welding operation it is important to know the heating value of the current applied. Also, if the duty cycle of the pulses is varied during a weld, it is important to know the heating value of the largest pulse. While these values may be determined by recording the current waveforms and determining the heating value from the peak value, waveshape and duration, it is far preferable to have a meter capable of directly indicating the R.M.S. values.

The present invention provides a meter capable of indicating the R.M.S. value of the welding current with satisfactory accuracy throughout the range of heat settings commonly employed. Further, in welders wherein the length of the current pulses varies during the welding operation, the meter is capable of giving an accurate R.M.S. value of the pulses of maximum heating value.

In accordance with the invention, a detector circuit is employed which is capable of yielding an output varying with the R.M.S. value of the current wave for each cycle or half-cycle thereof. This output is then supplied to a meter indicating circuit which indicates the maximum value of the R.M.S. signal over the welding cycle, and holds the indication for a sufficient time to permit convenient reading.

For additional usefulness, the meter can be switched to indicate peak values of the welding currents, and outlet is provided to enable the current waveform to be recorded.

Although the meter is particularly advantageous in the measurement of welding currents, it may also be used for other purposes such as measurement of current in inductances, relay coils, etc.

Further features and advantages of the invention will in part be pointed out and in part be obvious from the following description of a specific embodiment thereof.

In the drawings:
FIG. 1 is an overall block diagram of the meter of the invention;
FIG. 2 shows a suitable toroid coil pickup;
FIG. 3 is a circuit diagram of a specific embodiment;
FIG. 4 shows illustrative waveforms of the circuit of FIG. 3;
FIG. 5 is a detail of an alternative arrangement which may be employed in the circuit of FIG. 3; and
FIG. 6 shows waveforms useful in adjusting the R.M.S. detector circuits.

Referring to FIG. 1, the general arrangement of the meter is shown as including a pickup of suitable design, here shown as a toroid coil 10. The toroid coil, in use, is placed around the current carrying conductor, for example, the arm of a welding machine. In FIG. 1 the cross-section of such a conductor is indicated at 11. For convenience, the toroid may be of known split construction so that it can be placed around a conductor without requiring the circuit to be broken.

The voltage induced in toroid coil 10 is proportional to the rate of change or differential of the current in conductor 11. Therefore the toroid signal output is integrated in integrator 12 to produce a signal wave proportional to the current flowing in conductor 11 and of the same waveform. This signal is then supplied to R.M.S. detector circuits 13 to obtain corresponding R.M.S. current values. These are supplied through meter circuits 14 to a suitable indicator 15. A connection 16 from integrator 12 is provided for connection to a recorder, etc.

A toroid coil is particularly convenient as a pick-up for current measurements, since it is suitable for large currents, is well shielded from extraneous pick-up, and can be arranged to be placed around the current-carrying conductor without requiring the latter to be disconnected. However, other types of pick-ups can be used if desired, and integrator 12 omitted or replaced by a different circuit depending on the pick-up. For example, if the pick-up is of the type whose output is proportional to the quantity desired to be measured and of the same waveform, integrator 12 can be omitted.

FIG. 3 shows a detailed circuit diagram of a meter into which the toroid pickup of FIG. 2 is plugged. FIG. 4 shows explanatory waveforms, and waveforms (b) through (e) occur at point designated B through E in FIG. 3, respectively.

The toroid coil 10 in FIG. 2 has one output lead connected through resistor R45 to terminal 2 of connector 22. The other output lead is directly connected to terminal 3.

Connector 22 may be plugged into a matching section 22′, shown in FIG. 3. The input terminals 2 and 3 are connected to an attenuator comprising resistors R1 through R7 selected to provide desired current ranges for the instrument. The appropriate range for a given measurement is selectable by switch 32. The resultant signal at point 24 is fed through a series resistor R8 to the input of an amplifier comprising transistors Q1–Q5. The output at point 25 is fed back through capacitor C4 to the input of Q1. This forms an integrating circuit of known type comprising a series resistor and an amplifier, with a capacitive feedback around the amplifier.

To permit different pickups to be used with a given instrument, resistor R46 (FIG. 2) is connected between terminals 3 and 1 of connector 22. When the connector is plugged into 22′ of FIG. 3, resistor R46 is shunted across R8. Thus by selecting the proper value for R46, variations in the output of toroid 10 due to manufacturing tolerances can be taken into account. Similarly, the value of R45 is selected to take care of variations in toroid resistance so that the input attenuator of FIG. 3 functions accurately.

Returning to the integrator, transistor Q1 is connected as an emitter-follower and presents a relatively high impedance to the input and feedback signals. The output of Q1 is direct-coupled to Q2, the latter being connected as an amplifier of the grounded emitter configuration. R11 provides bias and temperature stabilization and is shunted by bypass capacitor C1. The capacitor C2 provides a voltage feedback loop around Q2 at frequencies above those of interest and hence limits the upper frequency response of the amplifier stage. The output of Q2 is direct-coupled to Q3 which functions as an emitter follower. The output of Q3 is direct-coupled through R9 to the input of Q1. This D.C. feedback path sets up bias levels on Q1–Q3 and stabilizes the operating points of these stages.

The output of Q3 is fed through capacitor C3 to a voltage divider comprising resistors R14–R17 and thence to the inputs of transistors Q4 and Q5. The voltage divider divides the signal evenly between Q4 and Q5 and also provides proper bias levels so that Q4 and Q5 deliver a push-pull output from a single-ended drive. The output impedance of Q4 and Q5 is very low, and hence suitable for driving the subsequent stages and also feed back a signal through C–4 for integration purposes.

Transistors of both PNP and NPN types are employed in the integrator 12 and in subsequent portions of the circuit. When the arrow of the emitter points toward the base, as in Q1, a PNP type is employed. When the arrow points away from the base, as in Q4, an NPN type is employed. As will be understood, the types employed depend on the detailed circuit design, and departures from those shown may be made as meets the requirements of a particular application.

The detailed features of integrator 12 do not form a part of the present invention and it is believed unnecessary to describe them in further detail. In general, any suitable integrator can be employed as desired.

The output of integrator 12 is fed through capacitor C5 to a step-up transformer T1 having a center-tapped secondary. Due to the integrating action of 12, the signal supplied to T1 will be proportional to the current passing through conductor 11 (FIG. 1) and of substantially the same waveform. Hence it is this signal whose R.M.S. value is to be determined (and also the peak value if desired). As indicated before, with other types of pick-ups or in meters designed for different applications, different instrumentalities may be employed to obtain the signal whose R.M.S. value is to be determined in the following R.M.S. detector circuit.

FIG. 4a shows waveforms illustrative of those encountered in resistance welding apparatus. At the left is shown a single cycle of 60-cycle alternating current having a positive half-cycle 31 and negative half-cycle 31'. This corresponds to an adjustment of the welder for maximum heat. The waveform may continue for additional cycles depending upon the welding application. The waveforms shown at 32 and 32' are positive and negative current pulses corresponding to a setting of the welder for a medium degree of heat. This is common obtained by applying a 60-cycle voltage to the welding transformer primary for only a portion of each half-cycle. Due to the large inductance of the welding transformer, the leading edges of the pulses are rounded as shown and the trailing edges are approximately sinusoidal. Thus the pulses 32, 32' are of the same general character as the positive and negative halves of the waveform 31, but the duty cycle is less. For a still lower degree of heat, the A.-C. voltage is supplied for a still shorter time during each half-cycle to give pulses such as shown at 33 and 33'. Here the duty cycle is still less but, due to the high inductance of the transformer, at least the trailing edges follow approximately a sinusoidal variation.

In some welding operations the duty cycle may be constant throughout the making of a weld, the duty cycle being selected to give the desired amount of heat. In others the duty cycle may vary during a weld, usually increasing. Also, the peak amplitudes may vary.

In this application pulses of the general characteristics shown in FIG. 4a are termed "A.-C. pulses," it being understood that the positive and negative halves of a sine wave such as shown at 31, 31' are included within this terminology.

In some applications it is possible for the input signal to consist of only one or a few A.-C. pulses of either polarity, or the pulses may be of different R.M.S. value with the maximum of either polarity. It is thus desirable for the meter to be able to measure the R.M.S. values of either positive or negative A.-C. pulses, or both. It is also advantageous to have the R.M.S. values of positive or negative pulses developed as signals of the same polarity to facilitate subsequent metering.

Accordingly, the secondary of transformer T1 is center-tapped and supplies the signals to a pair of rectifier circuits poled to pass pulses of opposite polarity, respectively. The two rectifiers are designated X1 and X2, and are advantageously semiconductor diodes. They are similar and only the upper one will be described in detail.

Rectifier X1 is connected from the upper terminal 26 of the transformer secondary through potentiometer R20 and resistor R21 back to the center tap lead 27. Accordingly, the voltage waveform at point B will be like that shown in FIG. 4b if the input signal is that of FIG. 4a. For convenience, the current waveform of FIG. 4a may be considered to be the voltage waveform at point 26. An adjustable portion of the rectified signal is fed from the slider of potentiometer R20 through line 28 to a contact of switch S1D labeled "Peak."

Switch S1D is one section of a switch having three other sections S1A, S1B and S1C, ganged together for simultaneous operation. As shown at the bottom of FIG. 3, the switch has four positions corresponding to "Off," "R.M.S.," "Peak" and "Test." The manner in which the peak value of the signal is indicated will be described later.

The rectified signal at point B is supplied to an integrating circuit, here shown as a resistance-capacitance integrator including a fixed resistor R25 and an adjustable resistor R26 in series, and a shunt capacitor C6. FIG. 4d shows integrated signals corresponding to the A.-C. pulses in FIG. 4b. Considering the first integrated signal, during the rapidly rising leading edge of A.-C. pulse 34 the voltage across C6 increases along the curved portion 41, and then rises somewhat more slowly over portion 42 since the pulse 34 has passed its peak and is decaying along the trailing edge thereof.

Returning to FIG. 3, transistor Q6 is connected as an emitter follower with its emitter-collector output circuit connected across capacitor C6, and its base is connected through R31 to the top of transformer secondary T1. Accordingly, the emitter-base input circuit of Q6 is supplied with the difference between the A.-C. pulses at point 26 and the signal across capacitor C6. So long as the positive voltage at point 26 is greater than the positive voltage at point 29, the transistor Q6 is cut off and capacitor C6 is allowed to charge. However, when the voltages at points 26 and 29 are substantially equal, Q6 begins to conduct and discharge capacitor C6. At this time, the voltage at point 26 will correspond to the trailing edge of 31 and hence will be falling rapidly. Consequently, Q6 will continue to conduct to discharge C6. This is shown in FIG. 4d where point 43 is substantially equal to the then-existing instantaneous potential 44 at the trailing edge of 31. Q6 will continue to conduct until capacitor C6 is substantially completely discharged. Thus Q6 functions as an electronic switching device to establish a discharge circuit for C6.

Other integrated signals are shown in FIG. 4d at 35', 36' corresponding to A.-C. pulses 35 and 36. It will be noted that the peak amplitudes of the integrated signals 35', 36' decrease, since there is less time for the integration and consequently the instantaneous values of the trailing edges of pulses 32 and 33 are less when they become equal to the integrated signals.

After a given positive A.-C. pulse at point 26, the potential thereof may go negative as shown in FIG. 4a. Thus base-collector current may flow in Q6, and this is limited to a safe value by R31. However, no reverse potential is built up across C6 which would impair the accuracy of the next integration.

It has been found by analysis, and confirmed experimentally, that with proper choice of the time constant of the integrating circuit the peak values of the integrated signals in FIG. 4d are proportional to the R.M.S. values of the corresponding A.-C. pulses 34–36. The determination of the time constant will be discussed after the remainder of FIG. 3 has been described. It will be noted that the A.-C. pulses are individually integrated, and each integrated signal removed prior to the integration of a succeeding pulse.

Rectifier X2 is connected to an integrating circuit the same as that described for X1, and develops integrated signals across capacitor C7. The rectified waves at point C are shown in FIG. 4c and the corresponding integrated signals at point E are shown in FIG. 4e. It will be noted that the polarity of the integrated signals across capacitor C7 is the same as those across C6.

The integrated signals are supplied to a peak-indicating circuit so that the peak R.M.S. value may be determined and indicated. It is desirable for the peak-indicating circuit to respond rapidly to the integrated signals, and yet hold its indication for a sufficient length of time to enable convenient reading. Although other suitable peak-indicating circuits could be employed for the purpose, that shown at the right of FIG. 3 has particular advantages for the present application.

In general, the circuit is arranged so that a storage capacitor is charged by an integrated signal until the stored signal bears a predetermined relationship to the integrated signal. A feedback signal is developed which is proportional to the signal on the storage capacitor and employed to interrupt the supply of integrated signals to the peak-indicating circuit whenever the integrated signals are less than a predetermined value with respect to the feedback signal. Thus the signal on the storage capacitor is maintained accurately proportional to the peak values of the input integrated signals so long as they increase. When the maximum integrated signal has been applied, subsequent integrated signals of lower amplitude have no effect. The circuit is designed to charge the storage capacitor quickly but to provide a very long time constant discharge circuit. An indicator such as a microammeter is then employed which is responsive to the signal on the storage capacitor.

Describing now the specific arrangement of the detailed embodiment, when switch sections S1C and S1D are in their R.M.S. position, the integrated signals on capacitors C6 and C7 are supplied to the input circuits of respective transistors Q8 and Q9. As shown Q8 and Q9 share a common emitter load R29 and a common collector load R30. The integrated signals from C6 and C7 are supplied to the bases of the respective transistors. Thus, the signals at point 45 are the combination of those in FIGS. 4d and e.

These signals are directly coupled through resistor R33 to Q11, a D.-C. amplifier of the grounded emitter type. The output of Q11 is directly coupled to Q12, connected as an emitter follower. The output of Q12 is directly coupled to Q13 and Q14, connected in parallel as an emitter follower. The common output of Q13 and Q14 is supplied through a uni-directional conductive device, here shown as a semiconductor diode X4, to the storage capacitor C9.

The cascaded emitter followers with a parallel emitter-follower output provide high peak charging currents for storage capacitor C9. Diode X4 is poled to provide a low impedance to currents in the charging direction of C9, but a high impedance to current in the discharge direction.

The feedback signal is developed by a plurality of transistors Q15, Q16 and Q17 connected in a cascaded emitter-to-base configuration with the emitter of the last transistor connected to resistance R41. This configuration provides an emitter follower with a very high input impedance at Q15 and a low output impedance at output lead 46. The cascaded emitter follower is connected across capacitor C9 so that the feedback signal at lead 46 is proportional to the stored signal on C9 to a high degree of accuracy. The input impedance at Q15 and the back resistance of X4 are sufficiently high so that the discharge of C9 has a very long time constant.

The feedback signal is supplied through lead 46 to the input of a control transistor Q10 connected as an emitter follower. Resistor R30 serves as the emitter load of Q10, and is common to the input circuits of Q8 and Q9. Consequently, when the feedback signal across R30 equals or exceeds the input signals developed thereacross from Q8 or Q9, transistors Q8 and Q9 are cut off. This cuts off the supply of integrated signals from point 45 to Q11, thereby stopping the charging of storage capacitor C9. A slight difference between the input and feedback signals may be required across R30 before Q8 and Q9 are cut off, but this will be substantially fixed for a given design and can be taken into account in initial calibration.

In operation, integrated signals of increasing peak value applied to Q8 and Q9 will result in corresponding increased stored signals across C9, the charging of C9 being stopped when the feedback signal across R30 is substantially equal to each integrated signal in succession. If an integrated signal of lower peak value then arrives, the feedback signal will keep Q8 and Q9 cut off so that the signal will not be supplied to the amplifier input at Q11. The overall result is that the signal on storage capacitor C9 will represent the maximum R.M.S. value of individual pulses during the operating interval.

A microammeter 47 is provided which is responsive to the stored signal on capacitor C9 and yields a corresponding indication. If the meter and its associated circuit components were connected directly across capacitor C9, the additional discharge path would decrease the storage time. Accordingly it is connected to the feedback lead 46, the potential of which is proportional to the stored signal on C9. As shown, microammeter 47 is connected to receive the feedback signal through a semiconductor diode X5 and dropping resistors R35, R36 and R37. R35 is adjustable for calibration purposes. R37 and capacitor C8 serve as a meter damping circuit.

Resistors R42, R44 and diode X3 provide a small bias for meter 47 to enable a linear meter and meter scale to be employed. It will be undertsood that diodes X1, X2 and X5 in general will not have ideal characteristics, but will have some non-linearity for small input signals so that the straight line portions of the diode input-output characteristics do not pass through the origin. While it is possible to employ a meter scale which is non-linear at the lower end and suitably calibrate the whole range, this is not entirely satisfactory due to variations between diodes of the same type. It is preferred to apply a small bias to meter 47 which corrects for this effect and yields satisfactory accuracy throughout the range of most interest.

To this end, a bias is developed by diode X3 whose current is supplied through R34. A small voltage will appear across X3 depending upon its characteristics. In a particular embodiment approximately 0.6 volt is developed. A fraction of this voltage is selected by a voltage divider composed of R42 and R44 and lead 48 of meter 47 connected thereto. With the proper bias, meter 47 will read accurately over all except the lowest portion of its scale, say the lowest 10%. This portion may be blocked out, or the decreased accuracy accepted.

Since capacitor C9 is capable of holding a signal for a long time, reset pushbutton switch S3 is provided so that the capacitor can be discharged after a given reading has been taken, ready for the next reading. Switch S3 has two switch arms 51 and 52. When the pushbutton is fully depressed, arm 51 contacts lead 53 and establishes a low impedance path through R24 to discharge C9. Switch S3 also has an intermediate lock position wherein arm 52 contacts lead 54 but arm 51 does not yet contact lead 53. In this intermediate position resistor R43 in series with R24 is shunted across capacitor C9. This shortens the time constant of the metering circuit and allows the continuous monitoring of cyclical inputs, such as the output currents of seam welders. R43 may be selected to give the proper time constant for the cyclical operation of the apparatus to be monitored.

The specific connections of transistors Q8 and Q9 warrant further explanation. With sufficient amplification of the input signals in integrator 12, it is unnecessary for transistors Q8 and Q9 to provide amplification. Accordingly, it suffices if they function essentially as switches to transfer the stored integrated signals on capacitors C6 and C7 to the input of Q11. On the other hand, it is desirable for Q8 and Q9 to have a high input impedance so as to have little, if any, effect on the charging of C6 and C7. Also, since Q8 and Q9 are D.-C. connected to Q11, any appreciable current flowing therethrough during no signal input would cause the meter 47 to read upscale. With Q8 and Q9 connected as shown, only a very small current flows from emitter to collector when there is no signal input to the base.

If desired, however, the transistors Q8 and Q9 may be connected as shown in FIG. 5. It will be noted that the connections to emitter and collector are reversed. If the configuration of FIG. 5 is used, it is desirable to select transistors having a low $I_{co}$.

Completing the description of FIG. 3, power is supplied to the meter from battery 55, shunted by capacitor C10 of large value so as to lower the A.-C. impedance of the power supply.

With switch S1 in the "Off" position, the battery circuit is opened by section S1B. In any other position, S1B closes the battery circuit. In the "R.M.S." position, sections S1C and S1D supply the integrated signals from capacitors C6 and C7 to the peak-indicating circuit as described above.

In the "Peak" position, sections S1C and S1D supply portions of the rectified waves of FIG. 4b and c to the inputs of Q8 and Q9, respectively. Thus the maximum peak value of the rectified pulses is stored on capacitor 9 and indicated by meter 47. Potentiometers R20 and R23 may be adjusted so that the same meter scale can be employed for R.M.S. and peak values.

In the "Test" position, meter 47 is connected across battery 55 through series resistors R19 and R44. Resistor R19 is advantageously selected so that the meter reads above a selected point, say half-scale, if the battery is in satisfactory condition.

The discussion of the time constant of the integrating circuits which give the R.M.S. values of the A.-C. pulses has been delayed to this point since, with an apppropriate range of adjustment for the time constant, the peak-indicating circuit is a convenient means for determining when it is correct.

As will be clear from the foregoing, the integrated signals across capacitor C6 or C7 should be proportional to the R.M.S. value of the A.-C. pulses applied to the respective integrating circuit. In general, the R.M.S. values of A.-C. pulses of the type for which the meter is intended to be used may be determined by graphical or mathematic analysis. Then the A.-C. pulses may be applied to the integrating circuit and the time constant adjusted until the integrated signals vary proportionally to the R.M.S. values thus determined.

Alternatively, it is possible to determine mathematically an RC time constant which will give the proper R.M.S. proportionality. However, the computation is rather involved, and still leaves the practical difficulty of determining the proper values of the R and C components when taking into account the other circuit components associated therewith which affect the overall time constant.

As will be understood, although the values of R25, R26 and C6 are principal factors, the time constant of the upper integrating circuit will also be affected by the forward resistance of X1, one-half the secondary resistance of T1, the shunting effect of the effective input resistances of Q6 and Q8, etc. The lower integrating circuit is similar. Hence adjustments such as provided by R26 and R28 are convenient in practice.

For the specific application to welding currents, it has been found that the proper time constant can be determined by utilizing waveforms such as shown in FIG. 6. FIG. 6a shows a simple 60-cycle sine wave 61 and its R.M.S. value is known to be 0.707P, where P is its peak value. By clipping the peaks at levels 62 and 63 selected so that the duration of each peak is one-half of the corresponding positive or negative half-cycle of the sine wave, and eliminating the D.-C. component, a resultant pulse wave with 50% duty cycle can be obtained. The resultant wave is shown in FIG. 6b after amplification to make its peak value equal to that of FIG. 6a. It can be shown that the R.M.S. value of the pulse wave of FIG. 6b is 0.5P.

The pulse wave of FIG. 6c can be obtained by gating out the first half of each positive and negative half-cycle of the sine wave of FIG. 6a. It can be shown that the R.M.S. value of such a wave is also 0.5P.

To adjust the R.M.S. integrating circuits of FIG. 3, the input integrating circuit 12 is removed from the circuit, as by disconnecting C5. The lower R.M.S. integrating circuit is rendered ineffective by setting R28 at its maximum value. With S1 in the R.M.S. position, a sinusoidal current of the waveform shown in FIG. 6a is applied to the primary of T1 and the reading on meter 47 noted. Then a current of the same peak value but with the waveform of FIG. 6b is applied, and the new reading on meter 47 noted. If the readings do not bear the ratio of 0.707 to 0.5, R26 is adjusted and the operation repeated until the correct ratio is obtained. A current of the same peak value but with the waveform of FIG. 6c is then applied as a check. This should give the same reading as that of FIG. 6b.

The time constant of the lower R.M.S. integrating circuit is then adjusted by applying the sine wave of FIG. 6a and reducing the value of R28 until an increased deflection of meter 47 is noted. Then R28 is backed off until the meter just returns to its former value, thus indicating that positive and negative half-cycles of the applied sine wave are giving equal R.M.S. indications on meter 47.

It has been found both by analysis and experiment that when the time constant is established in this manner, the R.M.S. value of welding currents is given with satisfactory accuracy over the range of duty cycles commonly encountered in practice.

In the foregoing adjustments, reset switch 53 is actuated as required to indicate an R.M.S. value lower than a previous reading.

While the use of the peak-indicating circuit facilitates adjustment, if desired the integrated signals across C6 and C7 may be measured by other means, such as an oscilloscope.

As an aid to the ready practice of the invention, it has been found in particular instances that when the above adjustments have been made the time constant of the integrating circuit is approximately 0.25T, where T is the period of the sine wave employed (1/60 second in these instances). Specific component values found satisfactory for a welding current meter are: 3K for R25 and R27, 2.5K for R26 and R28, and 1 mfd. for C6 and C7. Thus, the R.M.S. integrating circuit has a short time constant as compared to time constants customarily used for true mathematical integration, e.g., ten times the period of the waveform being integrated. It will be understood that the invention is not confined to these particular values.

Having adjusted the R.M.S. integrating circuits, the input integrating circuit 12 is restored to operation by reconnecting C5. R35 may be adjusted to give the proper reading on meter 47 for an input signal of known R.M.S. values. This is conveniently accomplished by applying a 60-cycle sine wave to input terminals 2 and 3 of connector 22′. Finally, switch S1 may be shifted to the "Peak" position and potentiometers R20 and R23 adjusted to give the proper reading on meter 47 for the peak value of the applied signal.

Certain additional considerations in the detailed design may be mentioned. As will be understood from the above explanation, R.M.S. values are developed individually for each A.-C. pulse across capacitor C6 or C7, depending on their polarity. Thus, with a suitable peak-indicating circuit it is possible to determine the R.M.S. value of only a single A.-C. pulse. However, it often suffices to provide an accurate reading for two or more A.-C. pulses, or for an A.-C. pulse exceeding a previous pulse by not more than, say, 10%. The accuracy of indication will depend on the time required to charge the storage capacitor C9 to the proper value, and this in turn depends upon the size of the capacitor and the charging current available. The discharge time constant of C9 is a function of the size of the capacitor, the input impedance at Q15 and the reverse impedance of diode X4. Decreasing the size of C9, with other factors unchanged, will increase the accuracy of indication of individual pulses, but will decrease the time allowed for reading meter 47. The accuracy can also be increased by employing high power transistors for Q13 or Q14, or resorting to vacuum tubes. In a practical instrument these factors can be balanced to meet the requirements of the intended application without involving undue expense.

The use of transistors and semiconductor diodes is advantageous to provide a reliable and readily portable instrument. However electron vacuum tubes, etc. may be employed if desired, with suitable circuit changes as required.

The invention has been described in connection with a preferred embodiment thereof. However, it will be understood that many modifications may be made within the spirit and scope of the invention.

I claim:

1. A meter for indicating the R.M.S. value of A.-C. pulses of the type described which comprises an integrating circuit, means for supplying said A.-C. pulses to said integrating circuit to produce corresponding integrated signals, means for removing from said integrating circuit the integrated signal corresponding to one pulse prior to the integration of a succeeding pulse, the time constant of said integrating circuit being predetermined to yield integrated signals substantially proportional to the R.M.S. values of respective A.-C. pulses supplied thereto, and indicating means responsive to said integrated signals.

2. A meter for indicating the R.M.S. value of A.-C. pulses of the type described which comprises integrating means for integrating each said pulse until the integrated value substantially equals the instantaneous value of the trailing edge of the respective pulse, means for removing from said integrating means the integrated value corresponding to one pulse prior to the integration of a succeeding pulse, the time constant of said integrating means being predetermined to yield integrated values substantially proportional to the R.M.S. values of respective A.-C. pulses supplied thereto, and indicating means responsive to said integrated values.

3. A meter for indicating the R.M.S. value of A.-C. pulses of the type described which comprises an integrating circuit, means for supplying said A.-C. pulses to said integrating circuit to produce corresponding integrated signals, means for removing from said integrating circuit the integrated signal corresponding to one pulse prior to the integration of a succeeding pulse, the time constant of said integrating circuit being predetermined to yield integrated signals substantially proportional to the R.M.S. values of respective A.-C. pulses supplied thereto, and a peak-indicating circuit for indicating the maximum of said integrated signals.

4. A meter for indicating the R.M.S. value of A.-C. pulses of the type described which comprises a resistance-capacitance integrating circuit, means for supplying said A.-C. pulses to said integrating circuit to charge said capacitance and produce corresponding integrated signals thereon, means for halting charging of said capacitance when the integrated signal thereon becomes substantially equal to the instantaneous value of the trailing edge of the respective pulse and for discharging the capacitance prior to the integration of a succeeding pulse, the time constant of said integrating circuit being predetermined to yield integrated signals substantially proportional to the R.M.S. values of respective A.-C. pulses supplied thereto, and means for indicating the maximum of said integrated signals.

5. A meter for indicating the R.M.S. value of A.-C. pulses of the type described which comprises a resistance-capacitance integrating circuit, means for supplying said A.-C. pulses to said integrating circuit to charge said capacitance and produce corresponding integrated signals thereon, an electronic switching device connected across said capacitance and responsive to the integrated signal and the pulse corresponding thereto to become conductive when the integrated signal and the instantaneous value of the trailing edge of the pulse become substantially equal, said switching device substantially discharging said capacitance prior to the integration of a succeeding pulse the time constant of said integrating circuit being predetermined to yield integrated signals substantially proportional to the R.M.S. values of respective A.-C. pulses supplied thereto, and a peak-indicating circuit responsive to the integrated signals of successive pulses for indicating them maximum thereof.

6. A meter for indicating the R.M.S. value of A.-C. pulses of the type described which comprises means for supplying said A.-C. pulses to a pair of rectifier circuits poled to pass pulses of opposite polarity respectively, integrating circuits supplied from said rectifier circuits, respectively, for integrating pulses of the respective polarity and produce corresponding integrated signals, means connected to each integrating circuit for removing the integrated signal corresponding to one pulse prior to the integration of a succeeding pulse in the respective circuit, the time constants of said integrating circuits being predetermined to yield integrated signals substantially proportional to the R.M.S. values of respective A.-C. pulses supplied thereto, and indicating means responsive to said integrated signals.

7. A meter for indicating the R.M.S. value of A.-C. pulses of the type described which comprises means for supplying said A.-C. pulses to a pair of rectifier circuits poled to pass pulses of opposite polarity respectively, a pair of resistance-capacitance integrating circuits connected to respective rectifier circuits for integrating pulses of the respective polarity and producing corresponding integrated signals on the respective capacitances, a pair of electronic switching devices connected across respective capacitances, each switching device being responsive to the difference between the integrated signal in the respective integrating circuit and the pulse corresponding thereto to establish a discharge circuit for the respective capacitance when the integrated signal and the instantaneous value of the trailing edge of the pulse become substantially equal, the impedance of said discharge circuit being sufficiently low to substantially discharge the respective capacitance prior to the applying of a succeeding pulse to the respective integrating circuit, the time constants of said integrating circuits being predetermined to yield integrated signals substantially proportional to the R.M.S. values of respective A.-C. pulses supplied thereto, a peak-indicating circuit, and means for supplying said integrated signals to said peak-indicating circuit to indicate the maximum value thereof.

8. A meter for indicating the R.M.S. value of A.-C. pulses of the type described which comprises an integrating circuit, means for supplying said A.-C. pulses to said integrating circuit to produce corresponding integrated signals, means for removing from said integrating circuit the integrated signal corresponding to one pulse prior to the integration of a succeeding pulse, the time constant of said integrating circuit being predetermined to yield integrated signals substantially proportional to the R.M.S. values of respecive A.-C. pulses supplied thereto, a peak-indicating circuit including an amplifier and a storage capacitor connected to the output thereof, means for supplying said integrated signals to the input of said amplifier, means for producing a feedback signal proportional to the signal on said storage capacitor, means for utilizing said feedback signal to interrupt the supplying of integrated signals to said amplifier when the integrated signals are less than a predetermined value with respect to the feedback signal, and indicating means responsive to the signal on said storage capacitor.

9. A meter for indicating the R.M.S. value of A.-C. pulses of the type described which comprises integrating means for integrating each said pulse until the integrated signal substantially equals the instantaneous value of the trailing edge of the respective pulse, means for removing from said integrating circuit the integrated signal corresponding to one pulse prior to the integration of a succeeding pulse, the time constant of said integrating means being predetermined to yield integrated values substantially proportional to the R.M.S. values of respective A.-C. pulses supplied thereto, a peak-indicating circuit including an amplifier and a storage capacitor connected to the output thereof through a substantially unidirectional conductive device, means for supplying said integrated signals to the input of said amplifier to charge said storage capacitor, a feedback circuit having an input circuit of high impedance connected to said storage capacitor to produce a feedback signal in the output circuit thereof substantially proportional to the stored signal on said storage capacitor, control means connected to the input of said amplifier and supplied with said feedback signal to substantially cut off the supplying of integrated signals to the amplifier which are less than a predetermined value with respect to the feedback signal, and indicating means responsive to the stored signal on said storage capacitor.

10. A meter for indicating the R.M.S. value of A.-C. pulses which comprises a resistance-capacitance integrating circuit, means for supplying A.-C. pulses to said integrating circuit to charge said capacitance and produce corresponding integrated signals thereon, an electronic switching device connected across said capacitance and responsive to the difference between the integrated signal and the pulse corresponding thereto to establish a discharge circuit for the capacitance when the integrated signal and the instantaneous value of the trailing edge of the pulse become substantially equal, the impedance of said discharge circuit being sufficiently low to substantially discharge said capacitance prior to the integration of a succeeding pulse, a peak-indicating circuit including an amplifier and a storage capacitor connected to the output thereof through a substantially unidirectional conductive device, means for supplying said integrated signals to the input of said amplifier to charge said storage capacitor, an emitter-follower feedback circuit including a plurality of transistors connected in a cascaded emitter-to-base configuration with the emitter of the last transistor connected to an output resistance, the input circuit of said feedback circuit being connected across said storage capacitor to produce a feedback signal in the output circuit thereof which is substantially proportional to the stored signal on the storage capacitor, means for comparing said feedback signal with said integrated signals and substantially cutting off the supplying of an integrated signal to said amplifier when the amplitude thereof is less than a predetermined value with respect to the feedback signal, and a meter circuit connected to receive said feedback signal and produce corresponding indications.

11. A meter for indicating the R.M.S. value of A.-C. pulses which comprises means for supplying A.-C. to a pair of rectifier circuits poled to pass pulses of opposite polarity respectively, a pair of resistance-capacitance integrating circuits connected to respective rectifier circuits for integrating pulses of the respective polarity and producing corresponding integrated signals on the respective capacitances, a pair of transistors having respective emitters and collectors connected across respective capacitances, means for supplying said A.-C. pulses to the bases of said transistors to discharge respective capacitances when respective integrated signals thereon become substantially equal to the instantaneous values of the trailing edges of corresponding pulses, a second pair of transistors having a common emitter load and a common collector load, connections for supplying the integrated signals on respective capacitances to respective bases of said second pair of transistors, a peak-indicating circuit including a D.-C. amplifier and a storage capacitor connected to the output thereof through a substantially unidirectional conductive device, a connection supplying the signal across one of said common loads to the input of said amplifier, an emitter-follower feedback circuit including a plurality of transistors connected in a cascaded emitter-to-base configuration with the emitter of the last transistor connected to an output resistance, the input circuit of said feedback circuit being connected across said storage capacitor to produce a feedback signal in the output circuit thereof which is substantially proportional to the stored signal on the storage capacitor, a transistor connected as an emitter-followed with the other of said common loads in the emitter circuit thereof, a connection supplying said feedback signal to the input of said emitter-follower to cut off said second pair of transistors when the feedback signal and the integrated signal in said other common load are substantially equal, a meter circuit connected to receive said feedback signal and produce corresponding indications, and means operable to discharge said storage capacitor.

12. Apparatus in accordance with claim 11 including switch means in said connections for supplying integrated signals to said second pair of transistors, and connections from said rectifier circuits to said switch means whereby rectified A.-C. pulses or said integrated signals may alternatively be supplied to said second pair of transistors.

References Cited by the Examiner

UNITED STATES PATENTS

| | | | |
|---|---|---|---|
| 1,898,827 | 2/33 | Franklin | 328—66 |
| 2,845,548 | 7/58 | Sillman | 307—88.5 |
| 2,897,444 | 7/59 | Garscia et al. | 324—103 |
| 2,913,625 | 11/59 | Finkelstein | 307—88.5 |
| 2,953,746 | 9/60 | Benewicz | 324—111 |
| 3,015,042 | 12/61 | Pinkaers | 307—88.5 |
| 3,034,057 | 5/62 | Fergunson | 324—103 X |

WALTER L. CARLSON, *Primary Examiner.*

BENNETT G. MILLER, *Examiner.*

UNITED STATES PATENT OFFICE
CERTIFICATE OF CORRECTION

Patent No. 3,201,688  August 17, 1965

Hugo S. Ferguson

It is hereby certified that error appears in the above numbered patent requiring correction and that the said Letters Patent should read as corrected below.

Column 1, line 14, for "have", second occurrence, read -- been --; line 52, after "and" insert -- an --; column 2, line 45, for "32" read -- S2 --; column 3, line 47, for "common" read -- commonly --; column 10, line 31, for "them" read -- the --; column 11, line 6, for "respecive" read -- respective --; column 12, line 9, after "A.-C." insert -- pulses --; line 38, for "emitter-followed" read -- emitter-follower --.

Signed and sealed this 19th day of April 1966.

(SEAL)
Attest:

ERNEST W. SWIDER
Attesting Officer

EDWARD J. BRENNER
Commissioner of Patents